(12) United States Patent
Morita

(10) Patent No.: US 6,783,094 B2
(45) Date of Patent: Aug. 31, 2004

(54) RECORDING-MEDIA TAPE REEL

(75) Inventor: Kiyoo Morita, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/887,124

(22) Filed: Jun. 25, 2001

(65) Prior Publication Data

US 2002/0005453 A1 Jan. 17, 2002

(30) Foreign Application Priority Data

Jun. 26, 2000 (JP) ........................................ 2000/191099

(51) Int. Cl.$^7$ ............................................. B65H 75/14
(52) U.S. Cl. .................................. 242/614; 242/608.8
(58) Field of Search ........................... 242/608.8, 610.6, 242/614, 614.1, 118.4, 345, 345.2

(56) References Cited

U.S. PATENT DOCUMENTS 5,829,712 A    11/1998   Morita

FOREIGN PATENT DOCUMENTS

| GB | 1 179 145 A | 1/1970 |
|----|---|---|
| WO | WO 99 65032 A | 12/1999 |
| WO | WO 0025314 A | 5/2000 |
| WO | WO 00 30111 A | 5/2000 |
| WO | WO 00 49614 A | 8/2000 |
| WO | WO 00 79536 A | 12/2000 |

Primary Examiner—William A. Rivera
(74) Attorney, Agent, or Firm—Sughrue Mion, PLLC

(57) ABSTRACT

A recording-media tape reel including a cylindrical hub with its center line as an axis of rotation, and a pair of disc flanges extending radially from upper and lower ends of the hub. The tape reel meets the following Equation:

$$H_1 - \alpha > H_2 + \beta$$

in which $H_1$ is a reference value for a distance from a reference plane perpendicular to the rotation axis along the bottom surface of the lower flange, to the radially inner end of the interior surface of the flange, $\alpha$ is a tolerance on the negative side of $H_1$, $H_2$ is a reference value for a distance from the reference plane to the radially outer end of the interior surface, and $\beta$ is a tolerance on the positive side of $H_2$.

22 Claims, 4 Drawing Sheets

F I G. 1
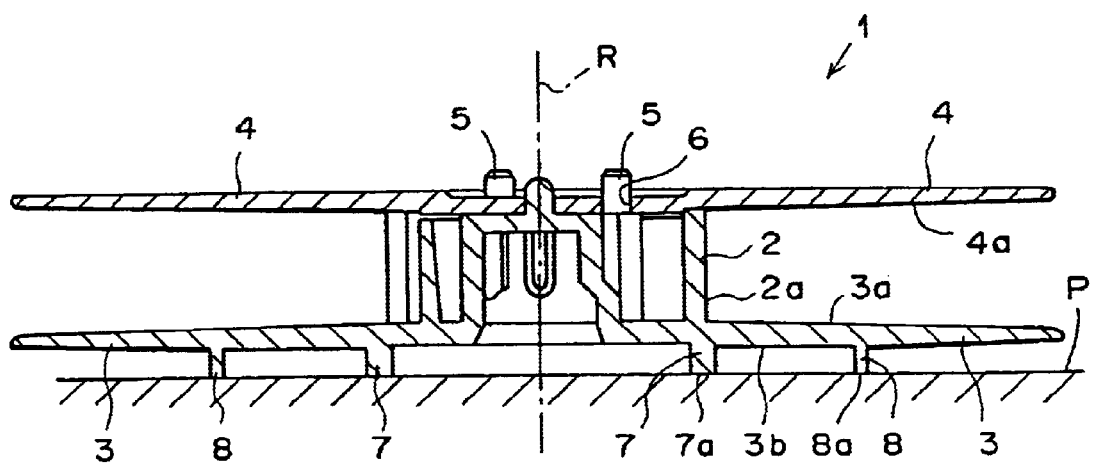

RECORDING-MEDIA TAPE REEL

BACKGROUND OF THE INVENTION

1. Field of the Invention

The present invention relates to a recording-media tape reel with disc flanges at the upper and lower ends of a cylindrical hub having an outer periphery on which tape is wound.

2. Description of the Related Art

Magnetic tape is used as recording media that are employed in an external storage unit for computers and other recording-reproducing units. The magnetic tape is wound on a tape reel and housed within a cartridge case. If the magnetic tape cartridge is loaded into a recording-reproducing unit, rotation of the tape reel causes the magnetic tape to run, and recording or reproduction of data relative to the recording surface of the magnetic tape is performed.

Recent magnetic tape has a large capacity and can store up to tens to hundreds of G bytes per reel. To realize this large capacity, a pitch between data tracks is narrowed, or tape thickness is made thin, or servo signals are written in. For this reason, the tape running mechanism of a drive unit and the cartridge structure are required to have high precision. Particularly, the precision of a reel configuration on which magnetic tape is wound is required to be high.

The above-mentioned tape reel is constructed of a cylindrical hub with its center line as an axis of rotation, and a pair of disc flanges extending radially from the upper and lower ends of the hub. Space for winding recording-media tape is formed between the outer periphery of the hub and the opposing interior surfaces of the flange pair. Generally, in the case where the tape reel is made up of resin-molded components, the lower flange and the hub are integrally formed and the upper flange separately formed is fixedly attached to the upper end of the hub.

The fixed attachment between the hub and the upper flange is usually performed by an ultrasonic welding method, using weld bosses or an energy director. The ultrasonic welding is being widely used for manufacturing tape reels, because it shortens manufacturing time, and because it uses a portion melted from a molded component as a binder and therefore reduces the running cost.

If, in a magnetic tape cartridge with such a tape reel, the interior surface of the flange being rotated makes contact with magnetic tape, there is a possibility that the problem of damage to the magnetic tape or dust occurrence will arise. This problem becomes a more important consideration, as recording density in the magnetic tape becomes greater, and as higher reliability is needed. Particularly, if the thickness of the magnetic tape (including a magnetic recording layer) is reduced to 20 µm or less, particularly 15 µm or less, damage to the magnetic tape due to the aforementioned rubbing will become conspicuous.

In view of the circumstances mentioned above, it is a first object of the present invention to provide a recording-media tape reel that is capable of preventing recording-media tape such as magnetic tape from making contact with the interior surface of the flange.

The aforementioned magnetic tape cartridge, incidentally, is divided into a one-reel type and a two-reel type. For example, a drive unit, which drives a one-reel type of tape reel, has an annular driving gear and a magnet at the top of a rotating shaft so that a chucking operation with the tape reel can be reliably performed. The drive unit is constructed such that the driving gear meshes with a reel gear formed in one end surface of the tape reel and drives the reel gear without play between them.

In the case where the tape reel is driven by the engagement between the driving gear and the reel gear, the chucking operation can be reliably performed, but it is fairly difficult to form both gears precisely. Therefore, when the tape reel is being rotated by the engagement between both gears, there is a slight surface runout in the radially outer ends of the upper and lower flanges of the tape reel, and therefore, the radially outer end of the flange is moved toward or away from the magnetic tape being unwound from the tape reel.

Thus, if there is surface runout in the engagement between the driving gear and the reel gear, a slight runout will occur in the rotation plane of the reel gear perpendicular to the rotation center of the driving gear, and surface runout at the radially outer end of the flange due to the influence will be increased. Furthermore, if the surface runout that the tape reel itself has because of low molding precision, etc. is added, a greater surface runout will occur.

On the other hand, the high precision of the position at which magnetic tape runs is required in order to assure the reliability of the recording-reproduction characteristics of the magnetic tape having the aforementioned high capacity. The high precision of the flange position is also required, because there is a possibility that if surface runout in the flange become great, the flange will make contact with magnetic tape and have a great influence on tape running precision.

However, there are cases where for engagement precision between the driving gear and the reel gear and the molding precision of the tape reel, it is difficult, from the viewpoint of mass production, etc., to assure sufficient precision to meet enhancements in recording density and recording precision.

Therefore, a second object of the present invention, in a recording-media tape reel equipped with a reel gear which meshes with a driving gear and is rotated, is to eliminate the influence of the flange on tape running and assure satisfactory recording-reproduction characteristics, even when there is surface runout in the tape reel being rotated.

SUMMARY OF THE INVENTION

To achieve the first object of the present invention mentioned above, there is provided a first recording-media tape reel comprising:

a cylindrical hub with its center line as an axis of rotation; and a pair of disc flanges extending radially from upper and lower ends of the hub so that space for winding recording-media tape is formed between an outer periphery of the hub and opposing interior surfaces of the flange pair;

wherein $H_1-\alpha>H_2+\beta$ is met, when $H_1$ is a reference value for a distance $H_{IN}$ from a reference plane, perpendicular to the rotation axis along an exterior surface of one of the two flanges, to a radially inner end of the interior surface of the one flange, $\alpha$ is a tolerance on a negative side of $H_1$, $H_2$ is a reference value for a distance $H_{OUT}$ from the reference plane to a radially outer end of the interior surface of the one flange, and $\beta$ is a tolerance on a positive side of $H_2$.

That is, the present invention is characterized in that the minimum value of $H_{IN}$ is always greater than the maximum value of $H_{OUT}$. It is preferable that this condition be established at any position on the reel, when the thickness of the recording-media tape is 20 µm or less, particularly 15 µm or less, and furthermore, 10 µm or less. The reason for this is that the aforementioned damage will tend to occur more easily, as the recording-media tape is made thinner. In addition, since thinner recording-media tape is used for high-density recording, damage will become a problem even when it is slight.

In the first recording-media tape reel, the one flange may be formed integrally with one end of the hub, and the other of the two flanges may be fixedly attached to the other end of the hub. In the case of such a tape reel, the upper and lower flanges are resin-molded components and integration of them is normally performed by ultrasonic welding, so there is a limit to the precision. Assuming $\Delta H = H_{IN} - H_{OUT}$, $\Delta H$ is not always constant at all positions along the radially outer end of the flange. Because of this, the aforementioned values of $H_{IN}$ and $H_{OUT}$ have tolerances, respectively, and manufacturing precision is managed so that the values of $H_{IN}$ and $H_{OUT}$ are within the tolerances. However, since it is obvious that it is more difficult, from the mechanical standpoint, to obtain the dimensional precision of the outer distance $H_{OUT}$ than to obtain the dimensional precision of the inner distance $H_{IN}$, a tolerance for $H_{OUT}$ is set wider than that for $H_{IN}$. Therefore, there are cases where there occurs, depending on the size of a tolerance, a reversed phenomenon that $H_{IN} \leq H_{OUT}$ is obtained, not $H_{IN} > H_{OUT}$.

According to the first recording-media tape reel of the present invention, the minimum value of $H_{IN}$, $H_1 - \alpha$, is always greater than the maximum value of $H_{OUT}$, $H_2 + \beta$. Therefore, the reversed phenomenon mentioned above will no longer occur. Even when recording-media tape is 20 µm or less in thickness, the recording-media tape can be prevented from being damaged because of rubbing between the tape and the flange interior surface.

To achieve the second object of the present invention mentioned above, there is provided a second recording-media tape reel comprising:

a cylindrical hub with an outer periphery on which recording-media tape is wound;

upper and lower disc flanges extending from upper and lower ends of the hub; and a reel gear meshable with a driving gear;

wherein, when the reel gear meshes with the driving gear and is rotated, a height of a radially outer end of the lower flange is at a position lower than a height of a radially inner end of the lower flange, and a height of a radially outer end of the upper flange is at a position higher than a height of a radially inner end of the upper flange.

In the second recording-media tape reel, the lower flange may be formed integrally with the lower end of the hub, and the upper flange may be fixedly attached to the upper end of the hub. In that case, it is preferable that t2>t1 be met, when t1 represents a difference between the heights of the radially inner and outer ends of the lower flange and t2 represents a difference between the heights of the radially outer and inner ends of the upper flange.

According to the second recording-media tape reel of the present invention, when the reel gear meshes with the driving gear and is rotated, the height of the radially outer end of the lower flange is at a position lower than the height of the radially inner end of the lower flange, and the height of the radially outer end of the upper flange is at a position higher than the height of the radially inner end of the upper flange. Therefore, the upper and lower flanges have no influence on tape running, even if they are subjected to the influence of surface runout caused by the engagement between the driving gear and the reel gear. Thus, since satisfactory running precision is assured, recording-media tape meeting the high-density requirement can be used in the tape reel of the present invention.

In addition, the value of t2 for the upper flange is set greater than that of t1 for the lower flange (t2>t1), because the amount of surface runout of the upper flange is basically greater than that of the lower flange near the reel gear.

BRIEF DESCRIPTION OF THE DRAWINGS

The above and other objects and advantages will become apparent from the following detailed description when read in conjunction with the accompanying drawings wherein:

FIG. 1 is a sectional view showing a tape reel constructed according to a first embodiment of the present invention;

DESCRIPTION OF THE PREFERRED EMBODIMENTS

Figure 2:
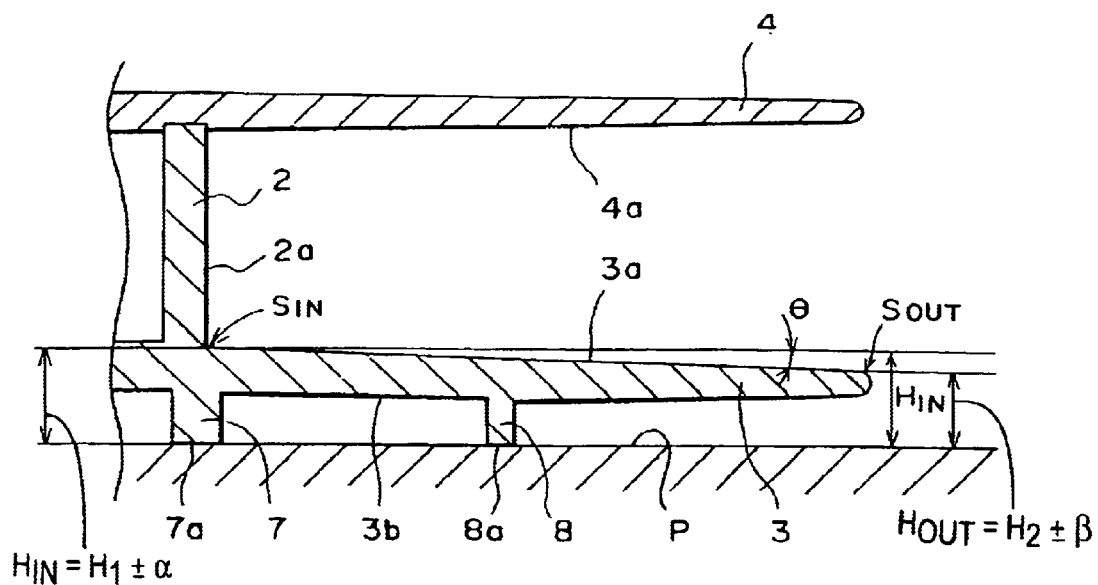
FIG. 2 is an enlarged sectional view showing the essential part of FIG. 1.

Preferred embodiments of the present invention will hereinafter be described in detail with reference to the drawings.

FIG. 1 illustrates a two-reel type tape reel to which the present invention is applied. The tape reel 1 includes a cylindrical hub 2 formed integrally with a lower flange 3, and an upper flange 4 formed as a discrete body. The cylindrical hub 2 and the upper flange 4 are welded together by ultrasonic welding. Between the outer periphery 2a of the hub 2 and the interior surfaces 3a, 4a of the upper and lower flanges 3, 4, space is formed for winding recording-media tape (not shown) such as magnetic tape, etc.

Within the cylindrical hub 2, a plurality of weld bosses 5 are provided at regular intervals in the circumferential direction so that they protrude upward in parallel to an axis of rotation, R, aligned with the center line of the hub 2. On the other hand, the upper disc flange 4 has transmission holes 6 into which the weld bosses 5 are inserted, at positions corresponding to the weld bosses 5. The upper flange 4 is placed on the hub 2, and the weld bosses 5 are inserted into the transmission holes 6 so that the upper ends of the weld bosses 5 project from the upper flange 4. With the annular tip end surface of a welding horn pressed against the upper end portions of the weld bosses 5, ultrasonic waves are applied to the upper portions of the weld bosses 5 to melt the weld bosses 5. The melted weld bosses 5 are flattened so that the upper flange 4 is fixedly attached to the hub 2.

The bottom surface 3b of the lower flange 3 has coaxial ribs 7, 8. A plane R, perpendicular to the rotation axis R, which includes the flat bottom faces 7a, 8a of the ribs 7, 8, is set as a reference plane along the bottom surface 3b of the lower flange 3.

As illustrated in FIG. 2, the tape reel 1 is constructed such that it meets the following Equation:

$$H_1 - \alpha > H_2 + \beta$$

where $H_1$ is a reference value for a distance $H_{IN}$, measured parallel to the rotation axis R, from the reference plane P to the radially inner end $S_{IN}$ of the interior surface 3a of the lower flange 3, α is a tolerance on the negative side of $H_1$, $H_2$ is a reference value for a distance $H_{OUT}$, measured parallel to the rotation axis R, from the reference plane P to the radially outer end $S_{OUT}$ of the interior surface 3a of the lower flange 3, and β is a tolerance on the positive side of $H_2$.

That is, the interior surface 3a of the lower flange 3 is inclined by an angle of θ to the reference plane P so that the radially outer end $S_{OUT}$ of the interior surface 3a of the lower flange 3 becomes lower than the radially inner end $S_{IN}$. In addition, the minimum value of $H_{IN}$ is always greater that the maximum value of $H_{OUT}$.

Assuming that, as an example of actual dimensions, $H_1$=2.24 mm, α=±0.1 mm, $H_2$=2.00 mm, and β=±0.1 mm, $H_{IN}$ becomes 2.24±0.1 mm and $H_{OUT}$ becomes 2.00±0.12 mm. Since $H_{IN}$ ranges from 2.14 to 2.34 mm and $H_{OUT}$ ranges from 1.88 to 2.12 mm, the minimum value (2.14 mm) of $H_{IN}$ is greater that the maximum value (2.12 mm) of $H_{OUT}$. Therefore, the tape reel 1 of the first embodiment meets the above-mentioned condition.

Thus, according to the first embodiment, dimensions are set so that the minimum value ($H_1$−α) of $H_{IN}$ is always greater that the maximum value ($H_2$+β) of $H_{OUT}$. Therefore, the reversed phenomenon mentioned above will not occur. Even in the case where magnetic tape of thickness 20 μm or less is employed, the first embodiment is capable of overcoming the drawback that the magnetic tape is damaged by rubbing between the magnetic tape and the interior surfaces of the flanges 3, 4 of the tape reel 1.

Figure 3:
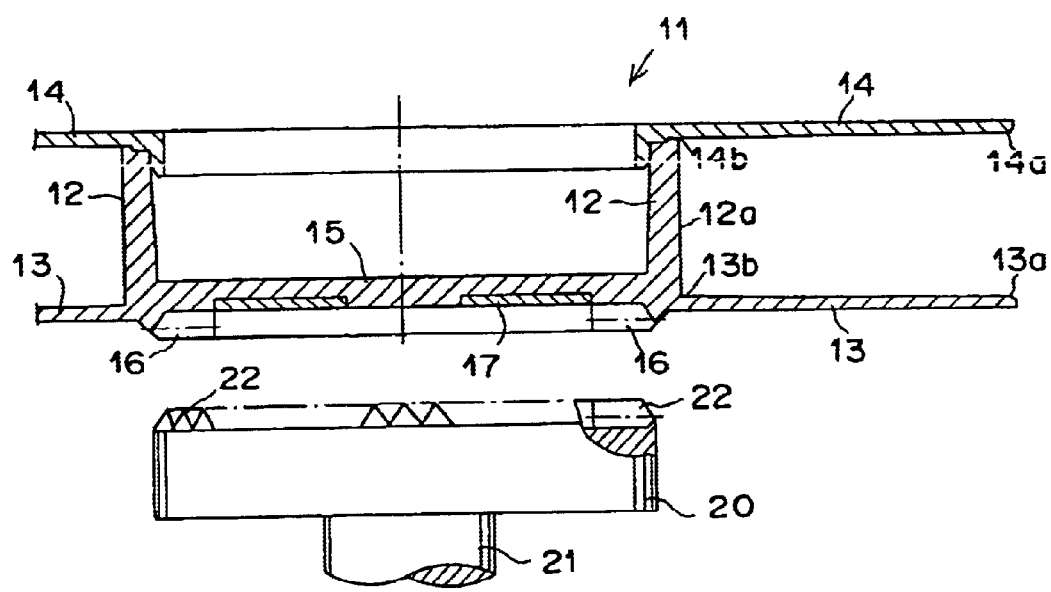
FIG. 3 is a sectional view showing a tape reel constructed according to a second embodiment of the present invention.
Figure 4:
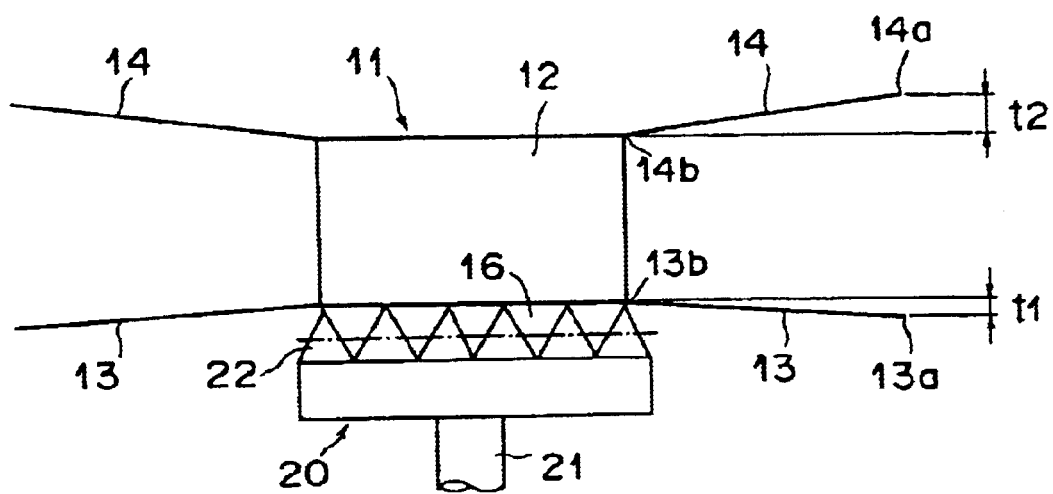
FIG. 4 is a schematic diagram showing the dimensional relationship of the tape reel shown in FIG. 3.

FIG. 3 illustrates a one-reel type tape reel constructed according to a second embodiment of the present invention. The dimensional relationship of the tape reel 11 is shown in FIG. 4. The tape reel 11 consists of a cylindrical hub 12, in which magnetic tape is wound on the outer periphery, and upper and lower disc flanges 13, 14 extending radially from the upper and lower ends of the outer periphery of the hub 12. One end (in the figure, the lower end) of the hub 12 and the lower flange 13 are integrally formed from synthetic resin. The upper flange 14, formed as a discrete body from synthetic resin, is fixedly attached to the other end (in the figure, the upper end) of the hub 12, by ultrasonic welding, etc.

The hub 12 has a bottom wall 15 so that the radially inner portion of the lower flange 13 is closed. The radially outer portion of the bottom surface 15 has an annular reel gear 16 for rotating the tape reel 11. Inside the annular reel gear 16, a reel plate 17 for magnetic attraction is formed by insert molding. If the tape reel 11 with recording-media tape is housed into a cartridge case (not shown), the reel gear 16 of the tape reel 11 is exposed through an opening formed in the bottom surface of the cartridge case.

In addition, a drive unit 20 is equipped with a driving gear 22 and a magnet (not shown), provided on the top of a rotating shaft 21. If the magnetic tape cartridge is loaded into a bucket (not shown) and is lowered toward the rotating shaft 21, the driving gear 13 meshes with the reel gear 16. The magnet of the driving unit 20 attracts the reel plate 17 of the tape reel 11 and keeps the meshed state between the driving gear 13 and the reel gear 16.

As shown in FIG. 4, the height of the radially outer end 13a of the lower flange 13 is at a position lower than that of the radially inner end 13b of the lower flange 13. Also, the height of the radially outer end 14a of the upper flange 14 is at a position higher than that of the radially inner end 14b of the upper flange 14. Note that the height between the radially outer ends 13a, 14a of the upper and lower flanges 13, 14 is the height between the opposing flange interior surfaces. Similarly, the height between the radially inner ends 13b, 14b of the upper and lower flanges 13, 14 is the height between the opposing flange interior surfaces. That is, the value t1 of the subtraction of the height of the radially outer end 13a of the lower flange 13 from the height of the radially inner end 13b of the lower flange 13 is positive (t1>0). The value t2 of the subtraction of the height of the radially inner end 14b of the upper flange 14 from the height of the radially outer end 14a of the upper flange 14 is also positive (t2>0).

The aforementioned height relationship is set so that it is always satisfied round the entire circumferences of the upper and lower flanges 13, 14 when the tape reel 11 is rotated by the engagement between the reel gear 16 and the driving gear 22.

More specifically, the values of t1 and t2 are set, in consideration of a combination of the influences of the engagement precision of the driving gear 22 and the reel gear 16, the molding and manufacturing precision of the upper and lower flanges 13, 14 of the tape reel 11, etc., so that the surface runout of the radially outer ends 13a, 14a of the upper and lower flanges 13, 14 relative to a plane perpendicular to the rotation axis of the rotating shaft 21 during rotation of the driving gear 22 does not make contact with the side portions of the recording-media tape being unwound from or rewound on the outer periphery of the hub 12. Note that the value of t2 for the upper flange 14 is set greater than that of t1 for the lower flange 13 (t2>t1), because the amount of surface runout of the upper flange 14 is basically greater than that of the lower flange 13 near the reel gear 16.

Therefore, even if there is a slight surface runout in the engagement between the driving gear 22 of the drive unit 20 and the reel gear 16, when the driving gear 22 meshes with the reel gear 16 and the running of the magnetic tape 11 is performed upon rotation of the tape reel 11, runout in the upper and lower flanges 13, 14 due to the influence of the aforementioned surface runout will have no influence on the height position, etc., of the recording-media tape being run. Thus, the recording-media tape can run a running path in a recording-producing unit at accurate height, and satisfactory recording-reproduction with high-recording density can be performed. This results in an enhancement in reliability.

While the present invention has been described with reference to the preferred embodiments thereof, the invention is not to be limited to the details given herein, but may be modified within the scope of the invention hereinafter claimed.

What is claimed is:

1. A recording-media tape reel comprising:

a cylindrical hub with its center line as an axis of rotation; and a pair of disc flanges extending radially from upper and lower ends of said hub so that space for winding recording-media tape is formed between an outer periphery of said hub and opposing interior surfaces of said flange pair;

wherein $H_1$−α>$H_2$+β met, when $H_1$ is a reference value for a distance from a reference plane, perpendicular to said rotation axis along an exterior surface of one of the two flanges, to a radially inner end of the interior surface of said one flange, α is a tolerance on a negative side of $H_1$, $H_2$ is a reference value for a distance from said reference plane to a radially outer end of said interior surface of said one flange, and β is a tolerance on a positive side of $H_2$.

2. The recording-media tape reel as set forth in claim 1, wherein said one flange is formed integrally with one end of said hub and the other of said two flanges is fixedly attached to the other end of said hub.

3. The reel of claim 2, wherein the reel is a single reel.

4. The reel of claim 2, wherein the tape has a thickness of less than or equal to 20 µm.

5. The reel of claim 2, wherein the tape has a thickness of less than or equal to 15 µm.

6. The reel of claim 2, wherein the tape has a thickness of less than or equal to 10 µm.

7. The recording-media tape reel as set forth in claim 1, wherein said recording-media tape is magnetic tape.

8. The reel of claim 1, wherein the reel is a single reel.

9. The reel of claim 1, wherein the tape has a thickness of less than or equal to 20 µm.

10. AThe reel of claim 1, wherein the tape has a thickness of less than or equal to 15 µm.

11. The reel of claim 1, wherein the tape has a thickness of less than or equal to 10 µm.

12. A recording-media tape reel comprising:
    a cylindrical hub with an outer periphery on which recording-media tape is wound;
    a bottom wall formed on a lower end of the hub;
    upper and lower disc flanges extending from upper and lower ends of said hub; and
    an annular reel gear formed on an outer portion of the bottom wall meshable with an annular driving gear;
    wherein, when said reel gear meshes with said driving gear and is rotated, a height of a radially outer end of said lower flange is at a position lower than a height of a radially inner end of said lower flange, and a height of a radially outer end of said upper flange is at a position higher than a height of a radially inner end of said upper flange.

13. The recording-media tape reel as set forth in claim 12, wherein
    said lower flange is formed integrally with the lower end of said hub;
    said upper flange is fixedly attached to the upper end of said hub; and
    t2>t1 is met, when t1 represents a difference between the heights of the radially inner and outer ends of said lower flange and t2 represents a difference between the heights of the radially outer and inner ends of said upper flange.

14. The reel of claim 13, wherein the reel is a single reel.

15. The reel of claim 13, wherein the tape has a thickness of less than or equal to 20 µm.

16. The reel of claim 13, wherein the tape has a thickness of less than or equal to 15 µm.

17. The reel of claim 13, wherein the tape has a thickness of less than or equal to 10 µm.

18. The recording-media tape reel as set forth in claim 12, wherein said recording-media tape is magnetic tape.

19. The reel of claim 12, wherein the reel is a single reel.

20. The reel of claim 12, wherein the tape has a thickness of less than or equal to 20 µm.

21. The reel of claim 12, wherein the tape has a thickness of less than or equal to 15 µm.

22. The reel of claim 12, wherein the tape has a thickness of less than or equal to 10 µm.

* * * * *